UNITED STATES PATENT OFFICE 1,942,790

VULCANIZATION ACCELERATOR

Ewald Zaucker and Max Bögemann, Cologne-Mulheim, and Ludwig Orthner, Leverkusen-I. G. Werk, Germany, assignors to I. G. Farbenindustrie Aktiengesellschaft, Frankfort-on-the-Main, Germany No Drawing. Application March 9, 1932, Serial No 597,806, and in Germany March 11, 1931

18 Claims. (Cl. 18—53)

The present invention relates to new vucanization accelerators, to a process of vulcanizing rubber and to the vulcanization products obtained with the aid of the said new vulcanization accelerators.

In accordance with the invention rubber is vulcanized after having incorporated therewith in any desired manner a substance containing the radical

wherein $x$ and $y$ mean vicinal carbon atoms of an aromatic nucleus (benzene or naphthalene nucleus, for example) or $x$ means nitrogen and $y$ sulfur, oxygen or the —NH— group.

It is the idea of the invention to have found that organic compounds containing the above grouping are valuable vulcanization accelerators, possessing an especially good critical temperature. The new accelerators, furthermore, can be applied with vulcanization accelerators of other types without the good critical temperature being substantially impaired.

The following formulæ are intended to show some types of compounds possessing the above mentioned grouping, without being limitative:—

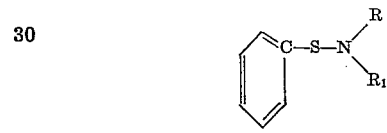

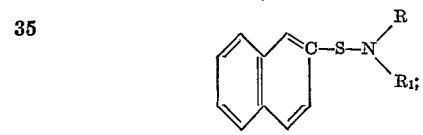

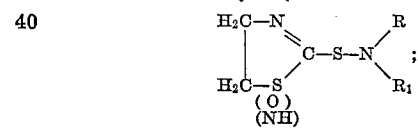

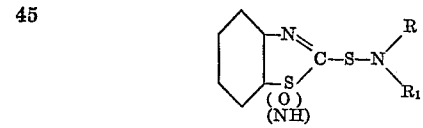

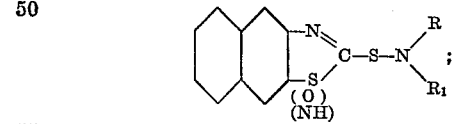

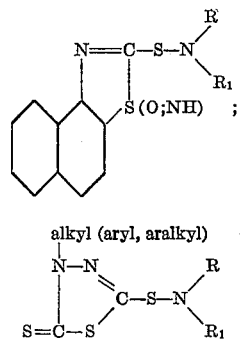

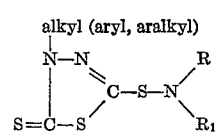

R and R₁ in the above formulæ may stand, for example, for similar or dissimilar alkyl, aralkyl or hydroaryl groups or jointly may represent a chain of alkylene groups, which may be interrupted by oxygen or sulfur. The group

therefore, may be represented, for example, by:—

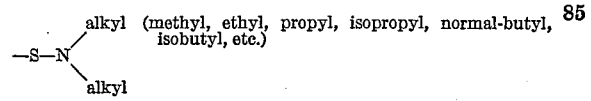

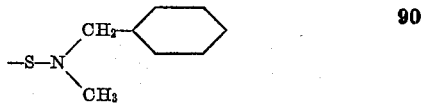

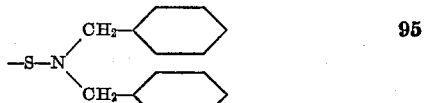

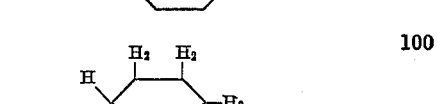

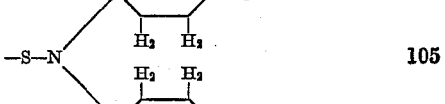

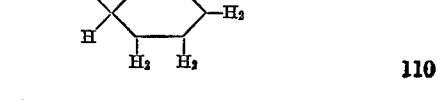

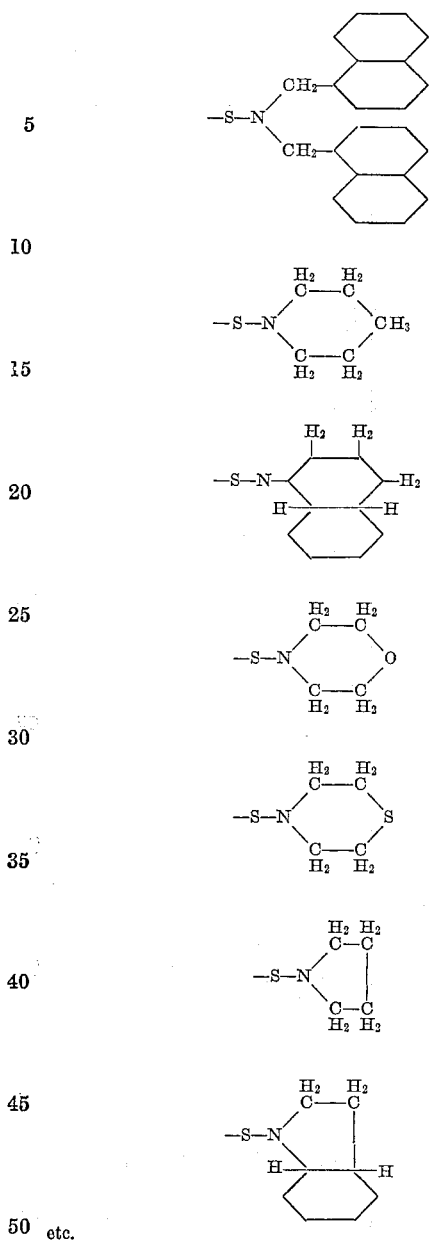

etc.

Obviously all the compounds in question may be substituted in the most various manner by monovalent substituents, such as halogen atoms, alkyl groups, nitro groups, hydroxy groups, alkoxy groups, amino groups, the carboxylic acid group etc. The preparation of our new accelerators may be performed according to various methods. For example, I. A metal salt (alkali metal salt, for example) of a compound containing the grouping

is caused to react with a N-halogen amine containing the grouping

in an aqueous or alcoholic solution, advantageously while gently heating. For example:—

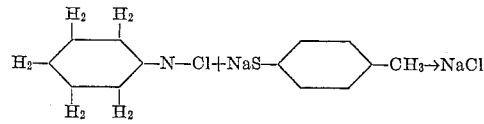

II. A compound containing the grouping

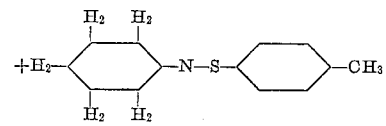

is caused to react with a compound containing the grouping

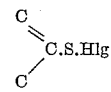

in an aqueous medium or another suitable solvent, such as alcohol, acetone, etc., advantageously while cooling. For example:—

III. A compound containing the grouping

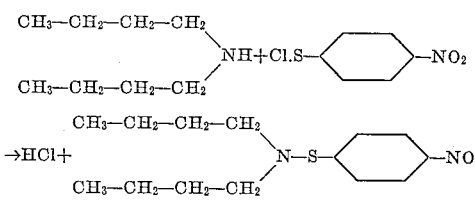

is caused to react with a compound containing the grouping

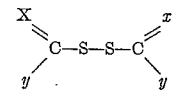

at elevated temperature (40–150° C., for instance). For example:—

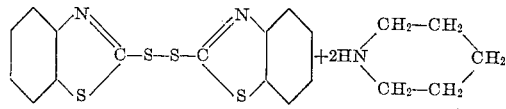
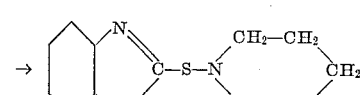
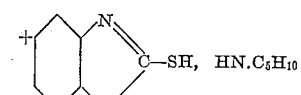

(The letters $x$ and $y$ in the above groupings are to be explained as mentioned on page 1.)

For vulcanization purposes the new vulcanization accelerators may be incorporated within rubber in any desired manner, for example, by rolling or kneading. A vulcanizing agent, such as sulfur, selenium, aromatic nitro compounds+metal oxides, are added to the vulcanization mixture together with or apart from the new vulcanization accelerators, and, if desired, filling materials (zinc oxide, carbon black etc.), plasticizing agents (stearic acid, tar etc.) and other ingredients known to favorably influence vulcanization processes or to improve the properties of the vulcanization products.

Vulcanization of the mixture is then performed by heating the same to temperatures usually applied in vulcanization processes (110–150° C. for example), until vulcanization is complete.

It may be mentioned that the term "rubber" as used in the disclosure and in the claims is intended to include as well natural rubber as the various artificial rubber-like masses obtainable, for example, by polymerizing butadiene, isoprene, dimethylbutadienes, chlorobutadiene etc. alone or in admixture with other polymerizable compounds, such as styrene, vinylnaphthalene, acrylic acid derivatives, unsaturated ketones etc.

The following examples illustrate the invention without restricting it thereto, the parts being by weight:—

*Example 1*

The reaction products from para-nitrophenyl sulfur chloride and dibutylamine (I), piperidine (II) sym.—diphenylguanidine (III) and ortho-tolylbiguanide (IV) were tested under a pressure of 3.5-atmospheres (superatmospheric) in the mixture:—

| | Parts |
|---|---|
| Light crepe | 100 |
| Sulfur | 3.5 |
| Zinc oxide | 5.0 |
| Stearic acid | 0.5 |
| Accelerator | 1.0 | ortho-nitrophenylsulfurchloride + diethanolamine, ortho- or para-nitrophenylsulfurchloride+methylbenzylamine ortho- or para-nitrophenylsulfurchloride+methylethylamine thiocresol+N-chloropiperidine, 2-mercapto-4-phenyl-1.3.4-thiodiazole-5-thion + N-chloropiperidine, 2-mercaptobenzothiazole+N-chloropiperidine, 2-mercaptobenzothiazole+N-chloromorpholine, 2-mercaptobenzothiazole+N-chlorodimethylamine, 2-mercaptobenzothiazole+N-chlorodibutylamine, 2-mercaptothiazoline+N-chloropiperidine, 2-mercaptoimidazoline + N-chlorodimethylamine, 2-mercapto-4-phenyl-1.3.4-thiodiazoline + N-chlorodibutylamine, 2-mercaptobenzoxazole + N-chloropiperidine, 2-mercaptobenzimidazole + N-chloropiperidine, 6-nitro-2-mercaptobenzothiazole + N-chloropiperidine, 6-dimethylamino-2-mercaptobenzothiazole + N-chloropiperidine, mercaptobenzometathiazone+N-chlorodimethylamine, 2-mercapto-4-phenyl-5-methyl-1.3.4-thiodiazoline+N-chloropiperidine.

We claim:—

1. Vulcanization accelerators consisting of organic compounds containing the grouping:—

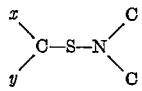

wherein $x$ and $y$ mean vicinal carbon atoms of an aromatic nucleus, or $x$ means nitrogen and $y$ sulfur, oxygen or the —NH—group.

2. Vulcanization accelerators consisting of compounds of the probable formula:—

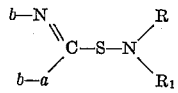

wherein $a$ means sulfur, oxygen or the —NH—group, the $b$'s jointly stand for the group —CH$_2$—CH$_2$— or represent vicinal carbon atoms of an aromatic nucleus, R and R$_1$ stand for alkyl, aralkyl, hydroaryl, or R and R$_1$ jointly stand for an alkylene group, which may be interrupted by oxygen or sulfur.

3. Vulcanization accelerators consisting of compounds of the probable formula:—

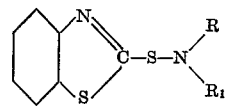

wherein R and R$_1$ mean alkyl groups containing one to 4 carbon atoms or the benzyl group, or R and R$_1$ jointly stand for the group —CH$_2$—CH$_2$—CH$_2$—CH$_2$—CH$_2$—.

4. Vulcanization accelerator consisting of the compound of the probable formula:—

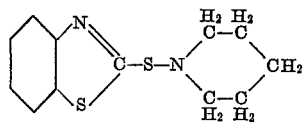

5. Vulcanization accelerator consisting of the compound of the probable formula:—

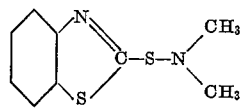

6. Vulcanization accelerator consisting of the compound of the probable formula:—

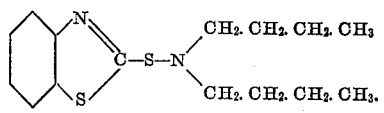

7. The process which comprises incorporating within rubber a vulcanizing agent and a vulcanization accelerator as claimed in claim 1 and vulcanizing the mixture.

8. The process which comprises incorporating within rubber sulfur and a vulcanization accelerator as claimed in claim 2 and vulcanizing the mixture.

9. The process which comprises incorporating within rubber sulfur and a vulcanization accelerator as claimed in claim 3 and vulcanizing the mixture.

10. The process which comprises incorporating within rubber sulfur and a vulcanization accelerator as claimed in claim 4 and vulcanizing the mixture.

11. The process which comprises incorporating within rubber sulfur and a vulcanization accelerator as claimed in claim 5 and vulcanizing the mixture.

12. The process which comprises incorporating within rubber sulfur and a vulcanization accelerator as claimed in claim 6 and vulcanizing the mixture.

13. A vulcanized rubber derived from natural rubber or an artificial rubber-like mass combined with a vulcanizing agent and a vulcanization accelerator as claimed in claim 1.

14. A vulcanized rubber derived from natural rubber combined with sulfur and a vulcanization accelerator as claimed in claim 2.

15. A vulcanized rubber derived from natural rubber combined with sulfur and a vulcanization accelerator as claimed in claim 3.

16. A vulcanized rubber derived from natural rubber combined with sulfur and a vulcanization accelerator as claimed in claim 4.

17. A vulcanized rubber derived from natural rubber combined with sulfur and a vulcanization accelerator as claimed in claim 5.

18. A vulcanized rubber derived from natural rubber combined with sulfur and a vulcanization accelerator as claimed in claim 6.

EWALD ZAUCKER.
LUDWIG ORTHNER.
MAX BÖGEMANN.